(12) United States Patent
Ebel

(10) Patent No.: US 7,992,446 B2
(45) Date of Patent: Aug. 9, 2011

(54) PRESSURE MEASURING METHOD AND DEVICE

(75) Inventor: Martin Ebel, Ingoldstadt (DE)

(73) Assignee: Conti Tech Microelectronic GmbH, Nurnberg (DE)

( * ) Notice: Subject to any disclaimer, the term of this patent is extended or adjusted under 35 U.S.C. 154(b) by 703 days.

(21) Appl. No.: 10/565,581

(22) PCT Filed: Jul. 22, 2004

(86) PCT No.: PCT/DE2004/001581
§ 371 (c)(1),
(2), (4) Date: Jan. 23, 2006

(87) PCT Pub. No.: WO2005/009781
PCT Pub. Date: Feb. 3, 2005

(65) Prior Publication Data
US 2007/0000559 A1    Jan. 4, 2007

(30) Foreign Application Priority Data
Jul. 22, 2003  (DE) .................................. 103 33 204

(51) Int. Cl.
*G01L 7/00*    (2006.01)

(52) U.S. Cl. ........................................................ 73/729.2
(58) Field of Classification Search ................. 73/729.2, 73/700; 701/29, 45
See application file for complete search history.

(56) References Cited

U.S. PATENT DOCUMENTS

| 6,098,000 | A  |   | 8/2000 | Long et al. |   |
| 6,253,132 | B1 | * | 6/2001 | Ikegami et al. | 701/45 |
| 6,415,210 | B2 | * | 7/2002 | Hozuka et al. | 701/29 |
| 6,874,772 | B2 | * | 4/2005 | Oldenettel | 267/64.28 |

FOREIGN PATENT DOCUMENTS

DE  38 04848 A1   8/1989
DE  102 02 579    5/2003

* cited by examiner

*Primary Examiner* — Andre J Allen

(57) ABSTRACT

Disclosed is a method for measuring pressure in a container (1) filled or capable of being filled, using a pressure sensor (6) and a control unit (5). The filling or emptying is carried out under the control of the control unit (5) which receives as input signal, in addition to the pressure value (Ps) measured by the pressure sensor (6), a switching state (8) of a valve (4) controlled to fill or empty the container (1).

12 Claims, 5 Drawing Sheets example filling

PRESSURE MEASURING METHOD AND DEVICE

BACKGROUND OF THE INVENTION

The invention relates to a method and to a device for implementing said method for measuring pressure of a container filled or capable of being filled with a medium, in particular for measuring an internal pressure in a container filled or capable of being filled, as this is used for example in connection with filling or emptying of an air bag in a seat for a motor vehicle and in connection with the fixing or holding of a predetermined or capable of being predetermined pressure of such an air bag.

Inflatable air bags for use in vehicle seats and for adaptation to different sizes or seating habits of the respective vehicle passengers are known in general.

However, it has proven to be disadvantageous with these known air bags and the devices used for them for filling or emptying as well as holding the respective pressure that by means of a pressure sensor provided for measuring pressure, in particular during filling or emptying due to conduit effects not the actual internal pressure, also called bag pressure, is measured. It is only in the idle state, i.e. after a certain slow-down period that the actual bag pressure can be determined by the pressure sensor. This makes the fast and exact adjustment and holding of predetermined bag pressures difficult.

SUMMARY OF THE INVENTION

It is, therefore, the object of the invention to indicate a method and a device suitable for implementing said method, by means of which the actual internal pressure can be determined with adequate accuracy at any time, in particular also during filling or emptying of a container.

This object can be achieved with regard to a method for measuring the pressure of a container filled with a medium by determining a corrected internal value during a filling or emptying process with aid of a pressure value determined by a pressure sensor depending on a switching state of a valve provided for filling or emptying the container. Furthermore, this object can be achieved with a device for measuring the pressure of a container filled with a medium. The device includes a pressure sensor for determining a pressure during a filling or emptying process and a control unit for determining a switching state of a valve provided for emptying or filling the container.

The invention starts from the conclusion that with known methods and devices the pressure sensor measures with adequate accuracy a too high pressure during filling and a too low pressure during emptying and during a holding period the actual pressure only after passing of a slow-down period. Thus for each switching state—filling, emptying or holding—of the valve, e.g. a control valve, a characteristic error is on hand, which should be compensated as completely as possible. Here it is provided that by means of a control unit information on an operating parameter representing the filling or emptying of a container, is processed preferably via the respective switching state of a valve effecting filling or emptying. For this purpose in accordance with the invention a corrected internal pressure is determined during a filling or emptying process of the container with the aid of a pressure value determined by means of a pressure sensor depending on a switching state of a valve provided for filling or emptying the container.

It is, therefore, the advantage of the invention that by means of the compensation of the measuring error a more exact as well as a faster pressure measuring in the container is possible, e.g. in an air bag of the vehicle seat, so that possible pressure variations caused by mechanical loads can be compensated adequately fast by corresponding control of the valve for filling or emptying.

For compensating an error preferably during filling or emptying of the container depending on the corresponding switching state of the valve the pressure value measured by the pressure sensor is actuated with at least one predetermined or capable of being determined parameter or parameter set characteristic for the filling or emptying of the container. In this way not only simple proportional corrections, but also corrections are possible, which represent the system dynamics, i.e. of the combination of container volume, hose volume, flow resistance, current bag pressure and mass inertia.

A particularly advantageous consideration of the system dynamics is that at the beginning or at the end of filling or emptying of the container depending on the corresponding switching state of the valve the pressure value measured by the pressure sensor is filtered. For example a filtering with low-pass characteristics is used as a possible form of embodiment of filtering. In this way overshooting at the beginning or at the end of filling or emptying is compensated particularly well. As the degree of overshooting depends on the start pressure, i.e. from the pressure in the container shortly before the beginning or the end of filling or emptying, a filtering with an adaptive low-pass filter is especially suitable, which operates as an integrator at a cut-off frequency appropriately selected.

As the effect of overshooting is limited to a certain time period after the beginning or the end of filling or emptying, it is particularly advantageous in relation to the computing power of the control unit available and/or expended, if the filtering of the pressure value measured by the pressure sensor after the beginning or the end of filling or emptying is performed only during the period of a predetermined or capable of being predetermined time period. Moreover, a permanent filtering causes distortion of the signal. Merely for minimizing noise the signal, in particular the pressure signal is filtered for example with a cut-off frequency of 10 Hz. For use as a filter formed as an integrator for instance a cut-off frequency of 0.1 Hz is suitable. Here, the filter parameters can be changed depending on the initial pressure.

Preferably, with a switching state of the valve, in which the container is neither filled nor emptied, i.e. when holding the current internal pressure, depending on the corresponding switching state of the valve the pressure value measured by the pressure sensor and the internal pressure determined on the basis of it are processed unchanged, i.e. without any correction. This in turn is favorable with regard to the computing power of the control unit, which is only loaded at minimum by a direct processing of the measured internal pressure, so that the computing power not needed is available for other tasks, e.g. for a controlled filling of another air bag in the same vehicle seat or in another vehicle seat.

If measurement of the pressure value is performed by the pressure sensor and on the basis of it the determination of the internal pressure in the region of a hose line provided for filling and/or emptying the container, the observed measuring error is increased by the hose line. Arrangement of the pressure sensor not in the container itself but in the region of the hose line, however, is advantageous, since a pressure sensor arranged at a seat bag as an example for a container will or can be perceived to be disturbing by a sitting person. By arranging the pressure sensor in the hose line and by the capability of compensation also of the error additionally increased by this, the comfortable seating as well as the adjustment possibility of the seat is improved by a faster and more accurate adjustability. Moreover, the arrangement can be manufactured at particularly low costs.

The advantage of the invention and its embodiments in particular consists in that the compensation of the error observed so far is performed with simple means. Instead of analyzing the complete system dynamics and realizing for the entire system a control method of considerable complexity, the invention here finds a particularly simple way, inasmuch as the error in relation to different operating modes, i.e. the filling of the container ("filling"), the emptying of the container ("emptying") and the holding of the current internal pressure ("holding") is considered separately. For each operating mode and for admitted transitions between the operating modes in the control unit a respective characteristic form of the error compensation is stored in form of a suitable functional context. In this case it is particularly advantageous that the error compensation for filling and the error compensation for emptying is characterized by functionally identical structures with merely different parameters where applicable. This means that the functional context must be stored only once in the control unit as a software and can be actuated depending on the switching state of the valve with corresponding parameters and then can be used for filling as well as for emptying the container.

BRIEF DESCRIPTION OF THE DRAWINGS

An example of embodiment of the invention is explained in detail in the following taken in conjunction with drawing. In all figures like objects or elements refer to identical reference numerals.

DETAILED DESCRIPTION OF THE DRAWINGS

Figure 1:
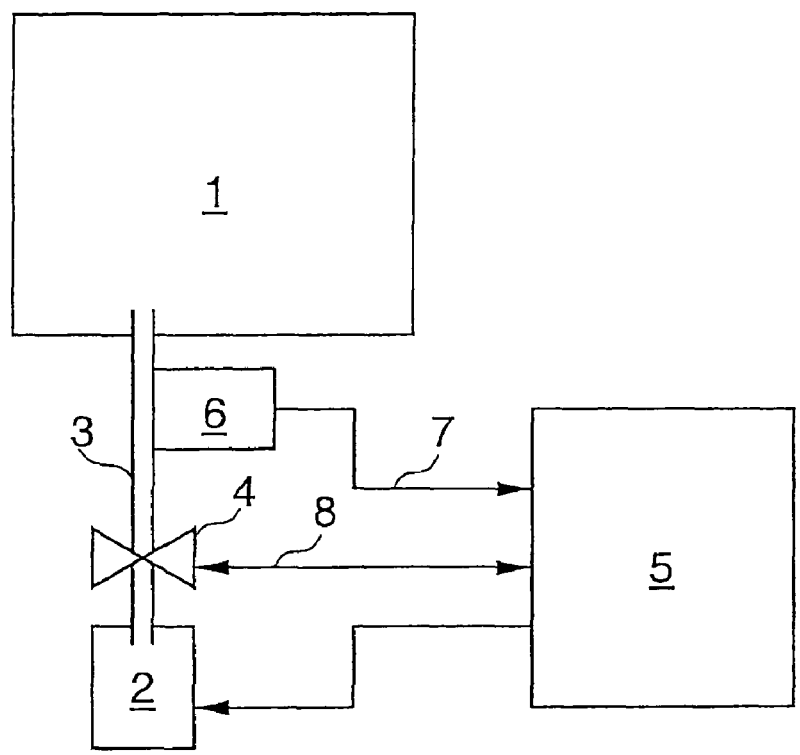
FIG. 1 shows a device for measuring pressure.

FIG. 1 shows a device for measuring pressure of a container 1 filled or capable of being filled with a medium M, whose filling or emptying is performed by means of a hose line 3 connected to the container 1 and to a pressure aggregate 2, e.g. a compressor. Filling or emptying of the container 1 is controlled by means of a valve 4 arranged in the hose line 3, which valve 4 is switched by a control unit 5. The control unit 5 activates also the pressure aggregate 2, where applicable. However, also an automatic activation of the pressure aggregate 2 can be provided, which then comprises at least one pressure measuring means (now shown), the automatic activation of the pressure aggregate 2 being performed depending on the pressure measured by the pressure measuring means.

For determining an internal pressure Pi representing the container 1 a pressure sensor 6 arranged at the hose line 3 is provided. The measured value delivered by the pressure sensor 6 is transferred to the control unit 5 as a pressure measuring value Ps. Apart from a switching state 8 of the valve 4 the pressure measuring value Ps is used for adjusting the predetermined internal pressure pi in the container 1.

Depending on the user's possibilities to intervene, i.e. for instance adjustability of the seat bag pressure of a seat bag embodied as container 1 by a sitting person, for filling or emptying of the container 1 or for holding the internal pressure Pi in the container 1 either the valve 4 or control keys (not shown) assigned to the control unit 5 are activated. When the user activates the valve 4 the respective switching state 8 is supplied to the control unit 5. When activating the control keys the valve 4 is triggered by a corresponding signal for the selected switching state 8—filling or emptying. The selected switching state 8 is then basically known on the side of the control unit 5 and must not necessarily be redelivered by the valve 4.

However, pressure measurement can be positively affected, if the selected switching state 8 as such is considered only if a corresponding information with regard to the switching state 8 of the valve 4 is on hand. Therewith, possible dead times at the transition of the valve 4 from one switching state 8 to the other may appropriately be considered.

Figure 2:
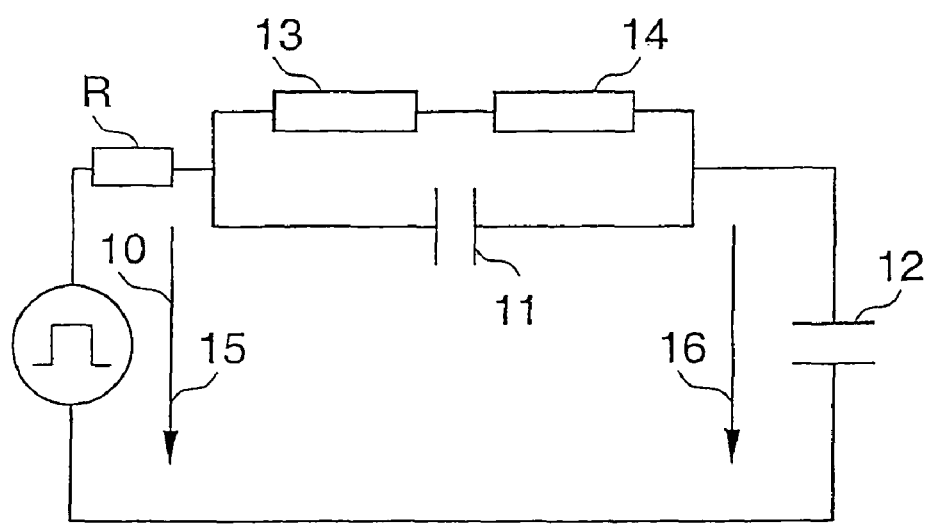
FIG. 2 shows an electrical equivalent circuit diagram of the device.

FIG. 2 shows an electrical equivalent circuit diagram of the device in accordance with FIG. 1. The connected pressure supply, i.e. the combination of pressure aggregate 2 and valve 4 is indicated by a source 10 with a series resistance R, where applicable. The volume of the hose line 3 is indicated by a first condenser 11 and the volume of the container 1 by a second condenser 12. The flow resistance of the hose line 3 is indicated by an ohmic resistance 13 and a mass inertia is indicated by an inductance 14. The combination of first condenser 11, resistance 13 and inductance 14 is the electrical equivalent circuit diagram, by means of which the hose line 3 is indicated. Here, a resonant circuit is concerned. Then, above the source 10 a sensor pressure 15 and above the second condenser 12 the actual container pressure 16 can be measured. The sensor pressure 15 corresponds to the pressure measuring value Ps (FIG. 1) delivered by the pressure sensor 6.

Figure 3A:
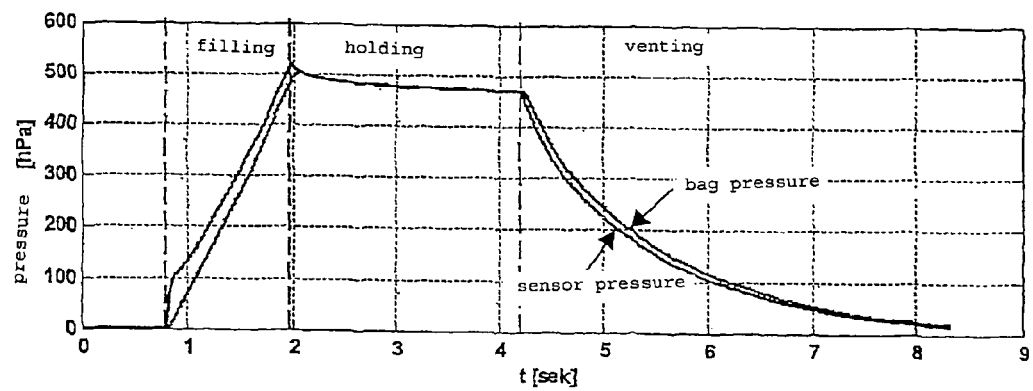
FIGS. 3a, 3b show typical filling and emptying processes.
Figure 3B:
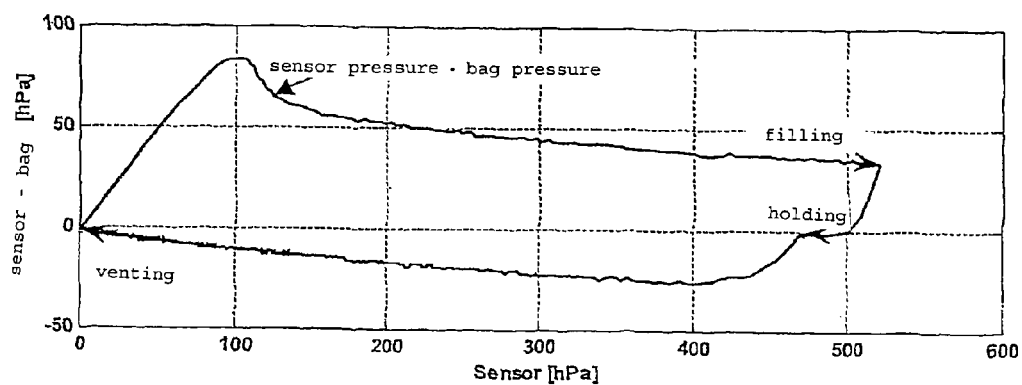

Consequently, the hose line 3 leads to the observed errors when determining the internal pressure Pi in the container 1. FIGS. 3a and 3b show typical filling and emptying processes, whereas on the one hand the switching states 8 of the valve 4 are drawn in as "filling", "emptying" or "holding" and on the other hand the pressure measuring value Ps delivered by the pressure sensor 6 is drawn in as a "sensor pressure". Further, the actual, not directly measurable internal pressure Pi of the container 1 is drawn in as a "bag pressure". Here, the view according to FIG. 3b shows a differential diagram.

Figure 4:
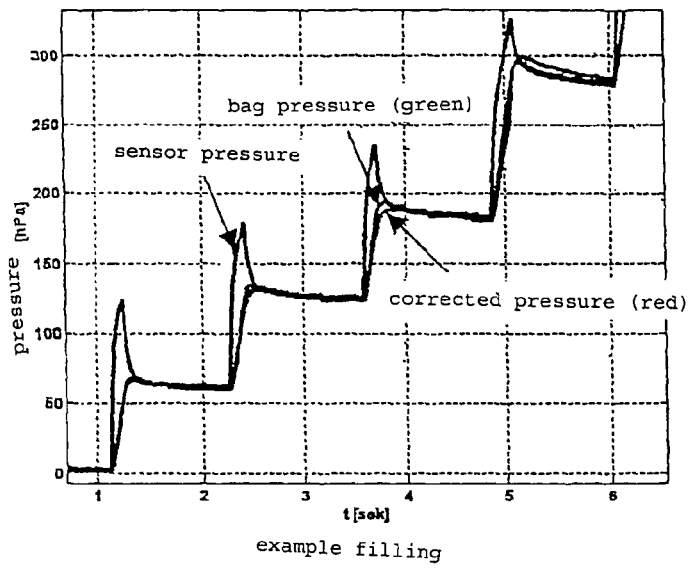
FIGS. 4, 5, 6 show typical filling and emptying processes with a corrected pressure measurement.
Figure 5:
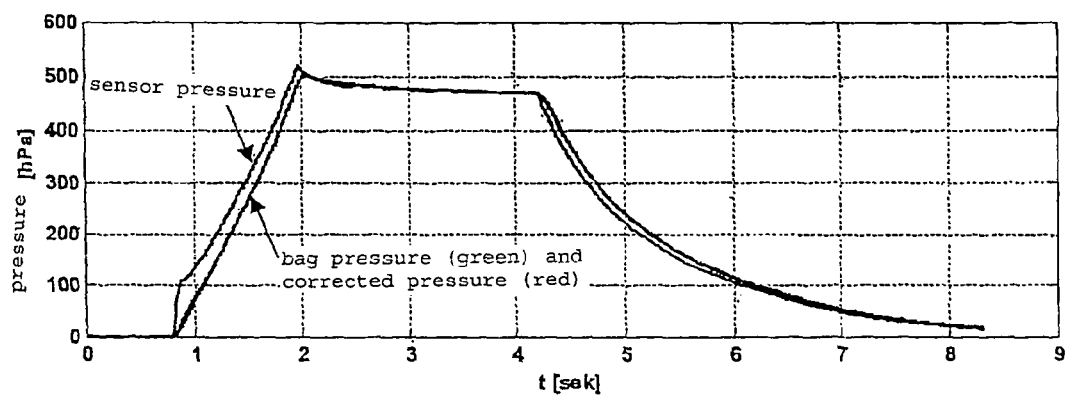
Figure 6:
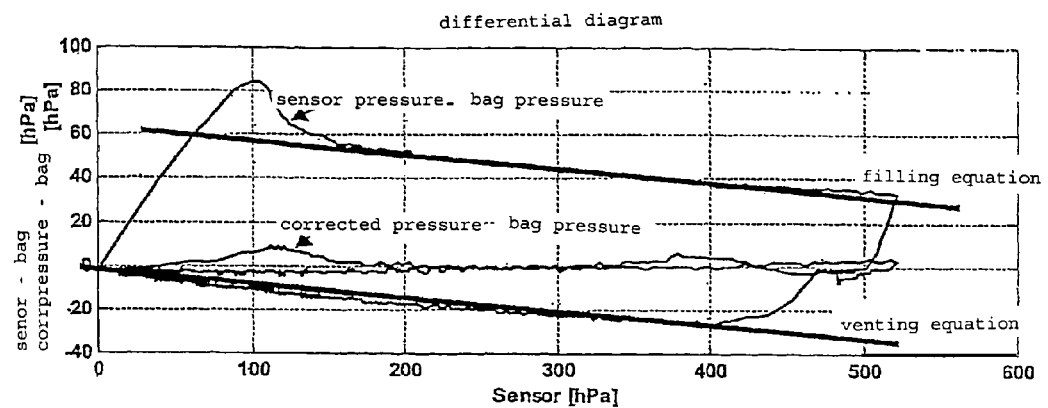

FIGS. 4, 5 and 6 show typical filling and emptying processes with a corrected pressure measurement. The pressure measuring value Ps delivered by the pressure sensor 6 in turn is drawn in as a "sensor pressure". FIG. 4 shows the process of filling the container 1. Overshooting is recognized each at the beginning of filling. With the computed corrected pressure $P_{corr}$ ("corrected pressure") which is nearly identical to the actual internal pressure Pi in the container 1 ("bag pressure"), one recognizes the complete elimination of overshooting due to the conducted filtering.

In FIG. 5, which corresponds to the view in FIG. 3a, again one after the other the impacts of the three switching states 8 (filling, holding, emptying) of the valve 4 are shown. Apart from the pressure measuring value Ps ("sensor pressure") delivered by the pressure sensor 6 the computed corrected pressure $P_{corr}$ ("corrected pressure") and the actual internal pressure Pi in the container 1 ("bag pressure") are shown. One can see that the computed corrected pressure $P_{corr}$ and the actual internal pressure Pi in the container 1 are nearly congruent.

In FIG. 6, which corresponds to the view in FIG. 3b, again the impacts of the three switching states 8 (filling, holding, emptying) of the valve 4 are shown in form of a differential diagram. Tangents are applied to characteristic sections of the resulting graph. From the linear equation describing the respective tangent a "filling equation" or "emptying equation" can be derived. The filling equation can be written in the form filling equation:

$$Pi = a1 \times Ps + b1 \quad [1]$$

and the emptying equation in the form emptying equation:

$$Pi = a2 \times Ps + b2, \quad [2]$$

whereas Pi is indicated as the internal pressure, a1 and a2 as factors for the gradient of the filling or emptying equation and Ps as the sensor pressure measured by the pressure sensor 6.

The parameters a1, b1 and a2, b2 of the filling or emptying equation are the parameters, with which the sensor pressure Ps measured by the pressure sensor 6 is actuated. This actuation comprises e.g. determination of a corrected value for the internal pressure Pi—the corrected pressure $P_{corr}$ according to:

$$\begin{aligned} P_{corr} &= Ps - |a1 \times Ps + b1| & [3] \\ \Leftrightarrow P_{corr} &= Ps - |\text{filling equation }[1]| & [4] \end{aligned}$$

in case of filling and of the corresponding switching state 8 of the valve 4 and $$\begin{aligned} P_{corr} &= Ps + |a2 \times Ps + b2| & [5] \\ \Leftrightarrow P_{corr} &= Ps + |\text{emptying equation }[2]| & [6] \end{aligned}$$

in case of emptying and of the corresponding switching state 8 of the valve 4, whereas the vertical lines "|", as it is usual in mathematics, stand for generating the amount.

Figure 7:
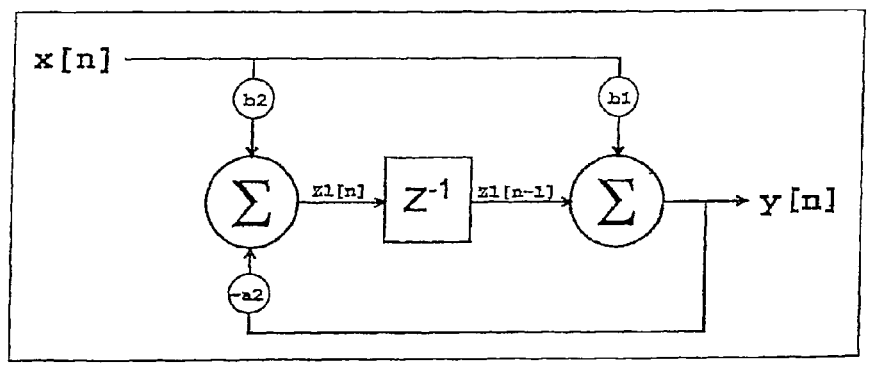
FIG. 7 shows a filter.

FIG. 7 shows a filter F with a standard filter structure, which is suitable as an adaptive low-pass filter TP for taking into consideration the circumstances at the beginning or at the end of filling or emptying the container 1.

Figure 8:
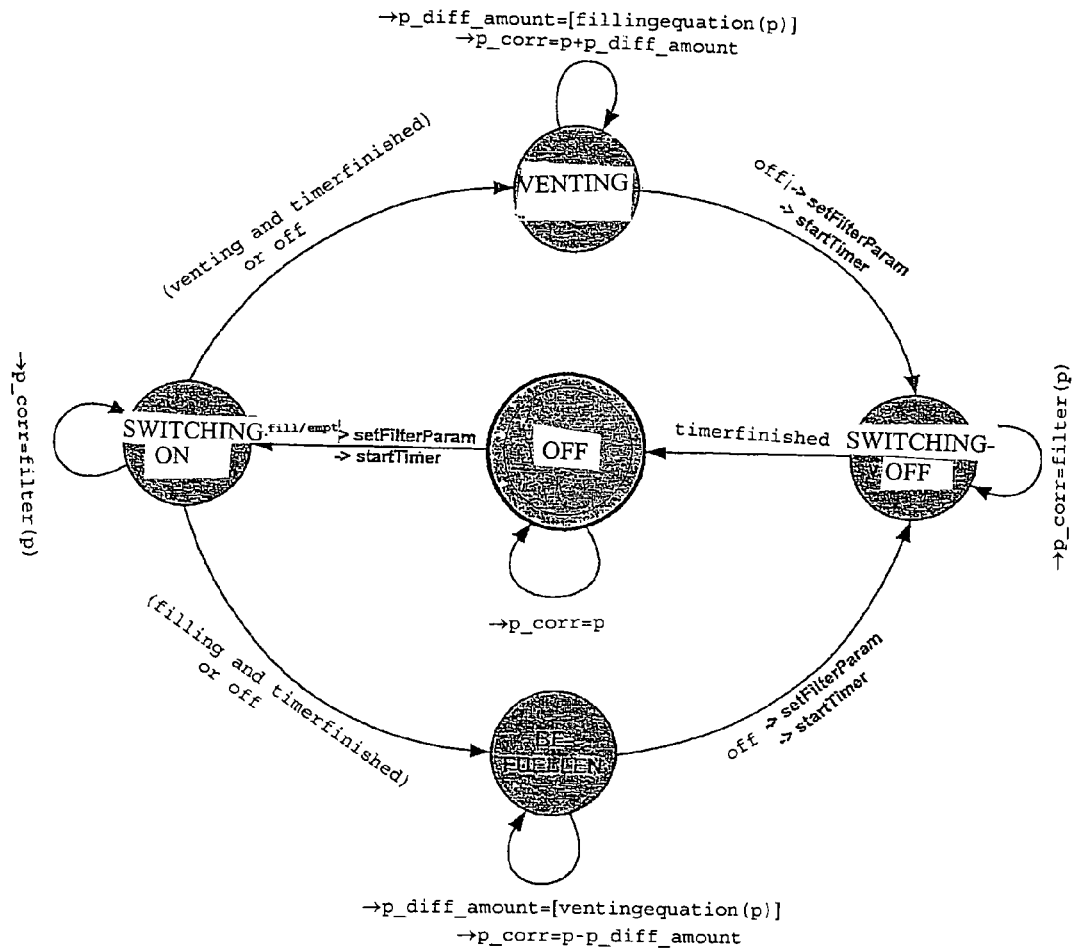
FIG. 8 shows the functional principle of the method according to the invention in form of a phase diagram.

FIG. 8 shows the functional principle of the method in accordance with the invention in form of phase diagram at the example of a filling or emptying process with air as a medium M for a seat bag in a motor vehicle.

As long as the valve 4 is closed, there is no air current, no conduit effects and thus the pressure sensor 6 measures the actual internal pressure Pi in the container 1, the seat bag. Directly after switching-on or -off, i.e. at the beginning or at the end of filling or emptying, overshooting occurs. Overshooting appears in particular during filling, but also during emptying depending on the parameters. This overshooting depends from the initial pressure and can be well compensated by means of the adaptive low-pass filter TP, which works as an integrator at correspondingly selected cut-off frequencies—shown in the phase diagram during the switch-on process as "$P_{corr}$=filter (p)". Here, the impact of the volume of the hose line 3, the mass inertia of the air and of the connected volume of the container 1 is compensated, which together form a principally vibratory system (see electrical equivalent circuit diagram, FIG. 2).

After a predetermined or capable of being predetermined waiting time, for example 50 ms, which expiration is realized by means of a timer, preferably as a software within the control unit 5, only the impact of the flow resistance is noticeable. For compensating a distortion, effected by means of the low-pass filter TP of the internal pressure Pi and for compensating a possible deterioration of the time-based termination, after expiration of the waiting time it is switched over to correction by means of the filling or emptying equation. Thus, the timer is started at the beginning or at the end of filling or emptying, so that during the expiration of the timer filtering of the measured pressure value Ps is effective. After expiration of the timer there is no more filtering, so that the correction is based on the impact of the filling or emptying equation.

The filling equation and the emptying equation are linear equations and can be taken directly from the differential diagram (see FIG. 6). Here, the pressure drop is compensated at the flow resistance of the hose line 3.

| List of reference numerals | |
|---|---|
| 1 | Container |
| 2 | Pressure aggregate |
| 3 | Hose line |
| 4 | Valve |
| 5 | Control unit |
| 6 | Pressure sensor |
| 8 | Switching state (of the valve) |
| 10 | Source |
| 11 | First condenser |
| 12 | Second condenser |
| 13 | Resistance |
| 14 | Inductance |
| 15 | Sensor pressure |
| 16 | Container pressure |
| F | Filter |
| Pi | Internal pressure |
| $P_{corr}$ | Corrected pressure |
| Ps | Pressure measuring value |
| R | Series resistance |
| TP | Low-pass filter |

The invention claimed is:

1. A method for measuring pressure of a container (1) filled with a medium (M), the method comprising:
determining a corrected internal value (Pcorr) during a filling or emptying process with aid of a pressure value (Ps) determined by a pressure sensor (6) depending on a switching state (8) of a valve (4) provided for filling or emptying the container (1), wherein at the beginning or at the end of filling or emptying of the container (1) depending on the corresponding switching state (8) of the valve (4) the pressure value (Ps) measured by the pressure sensor (6) is filtered.

2. A method according to claim 1, wherein during filling or emptying of the container (1) depending on the corresponding switching state (8) of the valve (4) the pressure value (Ps) measured by the pressure sensor (6) is actuated with at least one predetermined parameter (a1, a2, b1, b2) characterizing the filling or emptying of the container (1).

3. A method according to claim 1, wherein the pressure value (Ps) measured by the pressure sensor (6) is filtered after the beginning or the end of filling or emptying for a predetermined period of time.

4. A method according to claim 1, wherein in a switching state of the valve (4), in which the container (1) is neither filled nor emptied, the pressure value (Ps) measured by the pressure sensor (6) is processed unchanged.

5. A method according to claim 1, wherein the pressure value (Ps) is continuously determined by means of the pressure sensor (6) during the filling or emptying process of the container (1).

6. A device for measuring pressure of a container (1) filled with a medium (M) comprising:
- at least one pressure sensor (6) for determining a pressure value (Ps) during a filling or emptying process; and
- a control unit (5) for determining a switching state (8) of a valve (4) provided for filling or emptying the container (1), wherein a correct internal value (Pcorr) is determined by the control unit (5) with the aid of the pressure value (Ps) depending on the switching state (8) of the valve (4), wherein a filter (F) for filtering the pressure value (Ps) measured by the pressure sensor (6) is provided at the beginning or at the end of filling or emptying of the container (1) depending on the corresponding switching state (8) of the valve (4).

7. A device according to claim 6, wherein during filling or emptying of the container (1) depending on the corresponding switching state (8) of the valve (4) by means of the control unit (5) the pressure value (Ps) measured by the pressure sensor (6) can be corrected on the basis of at least one predetermined parameter (a1, a2, b1, b2) characterizing the filling or emptying of the container (1).

8. A device according to claim 6, wherein the filter (F) is embodied as a low-pass filter.

9. A device according to claim 8, wherein in a switching state (8) of the valve (4), which neither causes filling nor emptying of the container (1), provides a direct processing of the pressure value (Ps) measured by the pressure sensor (6).

10. A device according to claim 6, wherein a counter is provided.

11. A device according to claim 6, wherein the pressure sensor (6) for measuring the pressure value (Ps) is arranged in the region of the hose line (3) provided for filling and/or emptying the container (1).

12. A device according to claim 6, wherein the container (1) is an air bag in a seat of a motor vehicle.

* * * * *